(12) United States Patent
Arai et al.

(10) Patent No.: US 6,496,647 B2
(45) Date of Patent: Dec. 17, 2002

(54) VIDEO SIGNAL RECORDING APPARATUS AND METHOD, VIDEO SIGNAL REPRODUCTION APPARATUS AND METHOD, VIDEO SIGNAL RECORDING AND REPRODUCTION APPARATUS AND METHOD, AND RECORDING MEDIUM

(75) Inventors: Naohisa Arai, Kanagawa (JP); Masami Tomita, Chiba (JP); Taro Suito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/079,591

(22) Filed: May 15, 1998

(65) Prior Publication Data

US 2002/0150390 A1 Oct. 17, 2002

(30) Foreign Application Priority Data

May 27, 1997 (JP) .............................. 9-137112

(51) Int. Cl.[7] ................................ H04N 5/92
(52) U.S. Cl. ........................ 386/95; 386/124
(58) Field of Search ...................... 386/1, 45, 6, 69–70, 386/125–126, 95, 124; 348/700, 701, 702; 360/72.1, 72.2, 72.3; H04N 5/76, 5/92, 9/79, 5/781, 5/783

(56) References Cited

U.S. PATENT DOCUMENTS

| | | | | |
|---|---|---|---|---|
| 5,613,032 A | * | 3/1997 | Cruz et al. .................... | 386/69 |
| 5,703,655 A | * | 12/1997 | Corey et al. ................. | 348/468 |
| 5,826,206 A | * | 10/1998 | Nemeth ........................ | 386/69 |
| 5,930,446 A | * | 7/1999 | Kanda ......................... | 386/125 |
| 5,982,979 A | * | 11/1999 | Omata et al. ................. | 386/69 |
| 2001/0041055 A1 | * | 11/2001 | Kawamura et al. ........... | 386/95 |

* cited by examiner

Primary Examiner—Thai Tran
(74) Attorney, Agent, or Firm—Frommer Lawrence & Haug LLP; William S. Frommer; Darren M. Simon

(57) ABSTRACT

A video signal recording and reproduction apparatus comprising a video signal recording block and a video signal reproduction block. The video signal recording block includes a sub information/feature amount detector for detecting sub information and/or a feature amount from a video signal, an identification signal generator for generating identification signals corresponding to respective frames of the video signal in accordance with the sub information and/or feature amount, and a recorder for recording the identification signals together with the video signal in sectors of a program area on a recording medium. The identification signals are recorded in a sub code area in each sector of the program area containing the corresponding frames of the video signal. The video signal reproduction block includes an identification signal detector for detecting the identification signals from the sub code areas and reproduction means for generating a screen comprised of respective frames of the video signal recorded in the sector of the program area corresponding to the detected identification signals.

9 Claims, 11 Drawing Sheets

FIG.10B TOC AREA

FIG.10A PROGRAM AREA

VIDEO SIGNAL RECORDING APPARATUS AND METHOD, VIDEO SIGNAL REPRODUCTION APPARATUS AND METHOD, VIDEO SIGNAL RECORDING AND REPRODUCTION APPARATUS AND METHOD, AND RECORDING MEDIUM

BACKGROUND OF THE INVENTION

1. Field of the Invention

The present invention relates to a video signal recording apparatus and method, a video signal reproduction apparatus and method, and a video signal recording and reproduction apparatus and method for recording or reproducing a video signal together with a search screen for knowing an outline of the content of the video signal and searching the video signal, as well as a recording medium containing this search screen information.

2. Description of the Prior Art

Recently, a recording medium such as the optical disc, hard disc, or digital video tape for recording a video signal broadcast by a television broadcast or digital satellite broad cast has a recording capacity in the order of several mega and several tens of giga bytes. With a recording medium having such a large capacity, it is possible to continuously record a video signal for a long period of time such as several hours to 10 hours.

When such a recording medium is used to record a video signal of a television broadcast or the like, even by high-speed reproduction of the recording medium after the recording it is impossible to check all the contents for a short period of time. Consequently, when such a recording medium of a large capacity is used for recording a television broadcast or the like, a function is required for checking outlines of the contents recorded and recording positions of programs.

However, it has been very difficult to check the outline of the contents of a video signal recorded on a conventional recording medium. For example, there can be considered an interval reproduction for skipping a reproduction point for a predetermined period of time so as to check the outline of the contents recorded on a recording medium, but this interval reproduction carries out a reproduction regardless of an information content of a video signal recorded. Accordingly, it is difficult to grasp the contents of the video signal by this interval reproduction.

SUMMARY OF THE INVENTION

It is therefore an object of the present invention to provide a video signal recording apparatus and recording method for recording together with a video signal a search screen for grasping an outline of the content of this video signal and searching the video signal.

Moreover, another object of the present invention is to provide a video signal reproduction apparatus and reproduction method for reproducing the aforementioned search screen.

Yet another object of the present invention is to provide a video signal recording/reproduction apparatus and recording/reproduction apparatus for recording and reproducing the aforementioned search screen.

Still yet another object of the present invention is to provide a recording medium on which the aforementioned search screen information is recorded.

The video signal recording apparatus according to the present invention includes: sub information/feature amount detecting means for detecting a sub information and/or feature amount from a video signal; identification signal generating means for generating a one or more than one identification signals corresponding to respective screens of a video signal, according to the sub information and/or feature amount; and recording means for recording the identification signal together with the video signal on a recording medium.

In this video signal recording apparatus, identification signals corresponding to respective screens are recorded together with a video signal on a recording medium.

The video signal recording method according to the present invention includes: a step of detecting a sub information and/or feature amount from a video signal; a step of generating one or more than one identification signals corresponding to respective screens of the video signal, according to the sub information and/or feature amount; and a step of recording the identification signal together with the video signal on a recording medium.

In this video signal recording method, a video signal is recorded together with a sub information and/or feature amount of the video signal.

The video signal reproduction apparatus according to the present invention includes: identification signal detecting means for detecting one or more than one identification signals together with a video signal from a recording medium on which the one or more than one identification signals are recorded corresponding to respective screens according to a sub information and/or feature amount of the video signal; and reproduction means which uses the identification signal detected by the identification signal detecting means, for reproducing a video signal of the screen corresponding to the identification signal from the recording medium.

In this video signal reproduction apparatus according to the present invention, according to one or more than one identification signals generated according to a sub information and/or feature amount, a corresponding video signal is reproduced.

The video signal reproduction method according to the present invention includes: a step of detecting from a recording medium containing a video signal together with one or more than one identification signals recorded corresponding to respective screens according to a sub information and/or feature amount of the video signal, the one or more than one identification signals; and a step of reproducing from the recording medium, video signals of screens corresponding to the identification signals, according to the aforementioned identification signals detected.

In this video signal reproduction method, according to one or more than one identification signals generated according to the sub information and/or feature amount, a corresponding video signal is reproduced.

The video signal recording and reproducing apparatus according to the present invention includes a video signal recording block and a video signal reproduction block, the video signal recording block having: sub information/feature amount detecting means for detecting a sub information and/or feature amount from a video signal; identification signal generating means for generating a one or more than one identification signals corresponding to respective screens of a video signal, according to the sub information and/or feature amount; and recording means for recording the identification signal together with the video signal on a recording medium; and the video signal reproduction block having: identification signal detecting means for detecting the one or more than one identification signals from the recording medium and reproduction means which according to the identification signal detected by the identification signal detecting means, reproduces from the recording medium a video signal of the screen corresponding to the identification signal.

In this video signal recording and reproduction apparatus, a video signal is recorded on a recording medium together with an identification signal generated according to a sub information/feature amount corresponding to respective screens, and a video signal corresponding to this identification signal is reproduced.

The video signal recording and reproducing method according to the present invention includes: a step of detecting a sub information and/or feature amount from a video signal; a step of generating one or more than one identification signals corresponding to respective screens of the video signal, according to the sub information and/or feature amount; a step of recording the one or more than one identification signals together with the video signal on a recording medium; a step of detecting from the recording medium the one or more than one identification signals; and a step of reproducing a video signal of screens corresponding to the identification signals detected.

In this video signal recording and reproduction method, a video signal is recorded on a recording medium together with an identification signal generated according to a sub information and/or feature amount, and a video signal corresponding to this identification signal is reproduced.

The recording medium according to the present invention contains a video signal together with one or more than one identification signals recorded corresponding to respective screens of the video signal according to a sub information and/or feature amount of the video signal.

DETAILED DESCRIPTION OF PREFERRED EMBODIMENTS

Hereinafter description will be directed to a video signal recording apparatus according to an embodiment of the present invention with reference to the attached drawings. The video signal recording apparatus according to this embodiment is an apparatus for recording a video signal on a recording medium and generating an identification signal to be added respective screens according to a sub information and feature amount.

Figure 1:
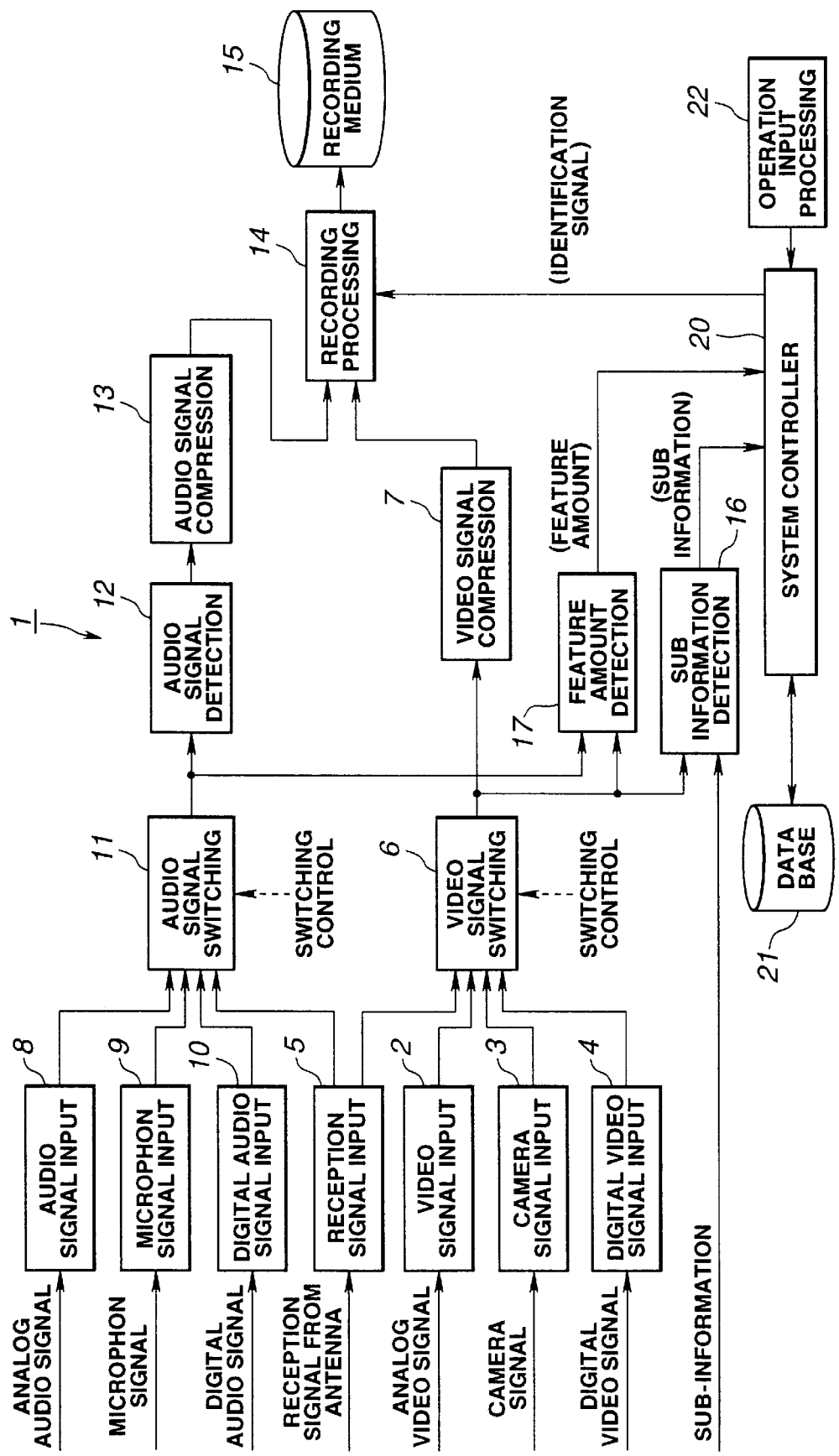
FIG. 1 is a block diagram showing a video signal recording apparatus according to an embodiment of the present invention.

FIG. 1 is a block diagram showing a video signal recording apparatus 1 according to the embodiment of the present invention.

The video signal recording apparatus 1 includes: a video signal input processing circuit 2 which is supplied through a cable with an analog video signal broadcast or transmitted; a camera signal input processing circuit 3 supplied with a transmission signal from a camera; a digital video signal input processing circuit 4 supplied with a digital video signal broadcast or transmitted; a reception signal input processing circuit 5 supplied with a video signal and an audio signal broadcast wireless; a video signal switching circuit 6 for switching between the video signals which have been input-processed by the video signal input processing circuit 2, the camera signal input processing circuit 3, the digital video signal input processing circuit 4, and the reception signal input processing circuit 5; and a video signal compression circuit 7 for compressing the video signal inputted.

Moreover, the video signal recording apparatus further includes: an audio signal input processing circuit 8 supplied with an analog audio signal broadcast or transmitted through a cable; a microphone signal input processing circuit 9 supplied with a transmission signal from a microphone; a digital audio signal input processing circuit 10 supplied with a digital audio signal broadcast or transmitted; an audio signal switching circuit 11 for switching between audio signals which have been input-processed by the audio signal input processing circuit 8, the microphone signal input processing circuit 9, the digital audio signal input processing circuit 10, and the reception signal input processing circuit 5; an audio signal detection circuit 12 for detecting an audio signal; and an audio signal compression circuit for compressing an audio signal inputted.

Moreover, the video signal recording apparatus 1 includes a recording processing circuit 14 for combining the video signal which has been compressed by the video signal compression circuit 7 with the audio signal which has been compressed by the audio signal compression circuit 13, and recording the obtained signal on a recording medium.

Moreover, the video signal recording apparatus 1 includes a sub information detecting circuit 16 for detecting a sub information of a video signal or a sub information overlapped with or added to each video signal; and a feature amount detecting circuit 17 for detecting feature amounts of the video signal and the audio signal.

Moreover, the video signal recording apparatus 1 includes: a system controller 20 for generating an identification signal according to the sub information and the feature amount and controlling the respective circuits; a data base 21 containing a data to be referenced by this system controller; an operation input processing circuit 22 for supplying a operation input information to this system controller 20.

The video signal input processing circuit 2 is supplied, for example, an analog video signal broadcast and an analog video signal transmitted through a cable. The video signal input processing circuit 2 converts this analog video signal into a base band video signal by way of demodulation or the like, and converts this base band video signal into a digital video signal for supply to the video signal switching circuit 6.

The camera signal input processing circuit 3 is supplied with, for example, a video signal picked up by a video camera. If the video signal from the video camera is an analog signal, the camera signal input processing circuit converts the signal into a base band video signal by way of demodulation or the like and converts this base band video signal into a digital video signal for supply to the video signal switching circuit 6. Moreover, if the video signal from the video camera is a digital signal, the camera signal input processing circuit 3 corrects an error in the signal and extend the signal which has been compressed for supply to the video signal switching circuit 6.

The digital video signal input processing circuit 4 is supplied, for example, with a video signal transmitted as a digital signal and a video signal which has been broadcast as a digital signal. The digital video signal input processing circuit 4 demodulates the video signal inputted, corrects errors, extends the signal which has been compressed, and other necessary processing for supply to the video signal switching circuit 6.

The reception signal input processing circuit 5 is supplied with a video signal and an audio signal which have been broadcast wireless and received by an antenna or the like. The reception signal input processing circuit 5 demodulates a video signal received so as to convert it into a base band video signal and converts this base band video signal into a digital video signal for supply to the video signal switching circuit 6, Furthermore, if the video signal is a digital signal, errors are corrected and a data compressed is extended for supply to the video signal switching circuit 6. Moreover, the reception signal input processing circuit 5 demodulates an audio signal received, converts the signal into a base band audio signal, and coverts this base band audio signal into a digital audio signal for supply to the audio signal switching circuit 11. Furthermore, if the audio signal is a digital signal, decoding is carried out by correcting errors and extending a data compressed for supply to the audio signal switching circuit 11.

The video signal switching circuit 6 is supplied with digital video signals from the video signal input processing circuit 2, the camera signal input processing circuit 3, the digital video signal input processing circuit 4, and the reception signal input processing circuit 5. The video signals inputted here are, for example, digital video signals of color difference signals. The video signal switching circuit 6, according to control from the system controller 20, selects one of the video signals inputted for supply to the video signal compression circuit 7, the sub information detecting circuit 16, and the feature amount detecting circuit 17.

The video signal compression circuit 7 is supplied with a digital video signal from the video signal switching circuit 6. The video signal compression circuit 7 compresses the digital video signal from the video signal switching circuit 6, for example, by using the MPEG2 (Moving Picture Experts Group 2), so as to be supplied to the recording processing circuit 14.

The audio signal input processing circuit 8 is supplied, for example, with an analog audio signal broadcast or transmitted through a cable. The audio signal input processing circuit 8 demodulates this analog audio signal, converts the signal into a base band audio signal, and converts this base band audio signal into a digital audio signal for supply to the audio signal switching circuit 11.

The microphone input processing circuit 9 is supplied with, for example, an audio signal detected by a microphone. If the audio signal from the microphone is an analog signal, the microphone signal input processing circuit 9 demodulates the signal into a base band audio signal and converts this base band audio signal into a digital audio signal for supply to the audio signal switching circuit 11. Moreover, if the audio signal from the microphone is a digital signal, decoding is carried out by correcting errors and extending a signal compressed, for supply to the audio signal switching circuit 11.

The digital audio signal input processing circuit 10 is supplied, for example, with a digital audio signal transmitted or broadcast as a digital signal. The digital audio signal input processing circuit 10 demodulates the audio signal inputted, converts the signal into a base band digital signal, corrects errors and extends a signal compressed, for supply to the audio signal switching circuit 11.

The audio signal switching circuit 11 is supplied with digital audio signals from the audio signal input processing circuit 8, the microphone signal input processing circuit 9, the digital audio signal input processing circuit 10, and the reception signal input processing circuit 5. The audio signal switching circuit 11, according to control from the system controller 20, selects one of the audio signals inputted, and supplies the signal to the audio signal detecting circuit 12 and the feature amount detecting circuit 17.

The audio signal detecting circuit 12 is supplied with the digital audio signal from the audio signal switching circuit 11. The audio signal detecting circuit 12, according to control form the system controller 20, supplies a signal to the audio signal compression circuit 13.

The audio signal compression circuit 13 is supplied with a digital audio signal from the audio signal detecting circuit 132. The audio signal compression circuit 13 compresses the digital audio signal from the audio signal switching circuit 11, by way of the MPEG audio method, for example, for supply to the recording processing circuit 14.

The recording processing circuit 14 is supplied with the digital video signal from the video signal compression circuit 7 and the digital audio signal from the audio signal compression circuit 13. The recording processing circuit 14 combines the digital video signal and the digital audio signal with a predetermined format, i.e., according to a recording format of the recording medium 15. Moreover, the recording processing circuit 14 generates a file management information called FAT (File Allocation Table), TOC (Table of Contents), sub code, and the like, according to the recording medium and combines the information with the digital video signal and the digital audio signal. It should be noted that these file information items may be generated by the system controller 20 and combined with a video signal by the recording processing circuit 14, for recording. The recording processing circuit 14 modulates these video signal and other signals to be recorded and carries out an addition of an error correction code before recording the signals onto the recording medium 15.

The recording medium 15 may be, for example, any of recording media such as a hard disc, a magnetic disc, a magneto-optical disc, an optical disc, tape, or a memory card.

The sub information detecting circuit 16 is supplied with a digital video signal from the video signal switching circuit 6. Moreover, the sub information detecting circuit 16 is supplied with a sub information supplied together with respective input video signals: a reception signal, an analog video signal from an antenna, a camera signal, or a digital video signal. The sub information detecting circuit 16 detects an information other than the image data of the digital video signal such as an information inserted in the vertical flyback time, a pilot information, or an additional information contained in a header portion of the digital video signal. Moreover, the sub information detecting circuit 16 detects a sub information supplied together with respective input video signals. This sub information will be detailed later.

The feature amount detecting circuit 17 is supplied with a digital audio signal from the video signal switching circuit 6 and a digital audio signal from the audio signal switching circuit 11. The feature amount detecting circuit 17 detects a motion amount, a telop, and an audio information from the video signal and the audio signal, and outputs the detected motion amount, telop, audio information as a feature amount. The feature amount detecting circuit 17 supplies a detected feature amount to the system controller 20. The feature amount will be detailed later.

The system controller 20 is supplied with a sub information from the sub information detecting circuit 16 and a feature amount from the feature amount detecting circuit 17. The system controller 20, according to the inputted sub information and the feature amount, generates an identification signal to be supplied to the recording processing circuit 14. This processing by the system controller 20 will be detailed later. The recording processing circuit 14 adds to a video signal the identification signal supplied from the system controller 20, and records it on the recording medium 15.

Moreover, the system controller 20 carries out switching control of the video signal switching circuit 6 and the audio signal switching circuit 11. That is, the system controller 20 identifies the type of a video signal and an audio signal inputted and carries out this switching control. Furthermore, the system controller 20 controls the audio signal detecting circuit 12.

Moreover, the system controller 20 is supplied with a control information and the like form the data base 21. The system controller 20, according to this control information, carries out various control operations.

Moreover, the system controller 20 is supplied with an operation input information from the operation input processing circuit 22. The system controller 20, according to this operation input information, carries out various control operations.

Next, description will be directed to the processing executed by the system controller 20, and sub information detected by the sub information detecting circuit 16 and the feature amount detecting circuit 17.

The sub information detecting circuit 16, as has been described above, detects a pilot information contained in the vertical flyback time of a video signal and a sub information contained in a header portion of the digital signal. More specifically, the sub information detected by this sub information detecting circuit 16 includes a telop appearance information, a music start information, a music end information, a person appearance information, a program content information, a program genre information, a broadcast time information, and the like.

The telop appearance information is an information indicating whether a telop such as superimpose contained in the video signal is present on the screen. The music start information and music end information indicates a start time and an end time of an audio signal contained together with the video signal. The person appearance information is an information indicating whether a person is present on the screen. This person appearance information, for example, indicates that a particular sports player A is on the screen. The program content information is an information indicating a specific program name and the like of the video signal broadcast. The program genre information is an information indicating the genre of the program of the video signal broadcast. The program genre information indicates, for example, a news program, sports program, movie, and the like. The broadcast time information is an information indicating a time band of broadcast.

If such a sub information is contained, for example, in a header portion of the video signal, the sub information detecting circuit 16 supplies the information to the system controller 20.

The feature amount detecting circuit 17, as has been described above, detects a feature amount from the video signal and the audio signal. The feature amount may be a video motion information, i.e., motion vector information, and a telop appearance information of a telop inserted into a screen, or a music start or end information, and the like. The motion amount may be detected, for example, by a representative point matching, block matching method, and the like. It is possible to use any method for this. Moreover, a telop may be detected, for example, by a method of detecting a pixel having a constant luminance continuously along the time axis; a method of detecting an area having a higher luminance level compared to the pixels in the vicinity; a method of detecting an edge in the screen, so as to detect an edge pattern continuous in a predetermined area; a method for comparing contrast with a background and uses its histogram for detection. The telop detection is not to be limited to a particular method.

The feature amount detecting circuit 17 detects such a feature amount from the video signal and the audio signal and supplies the information to the system controller 20.

Figure 2:
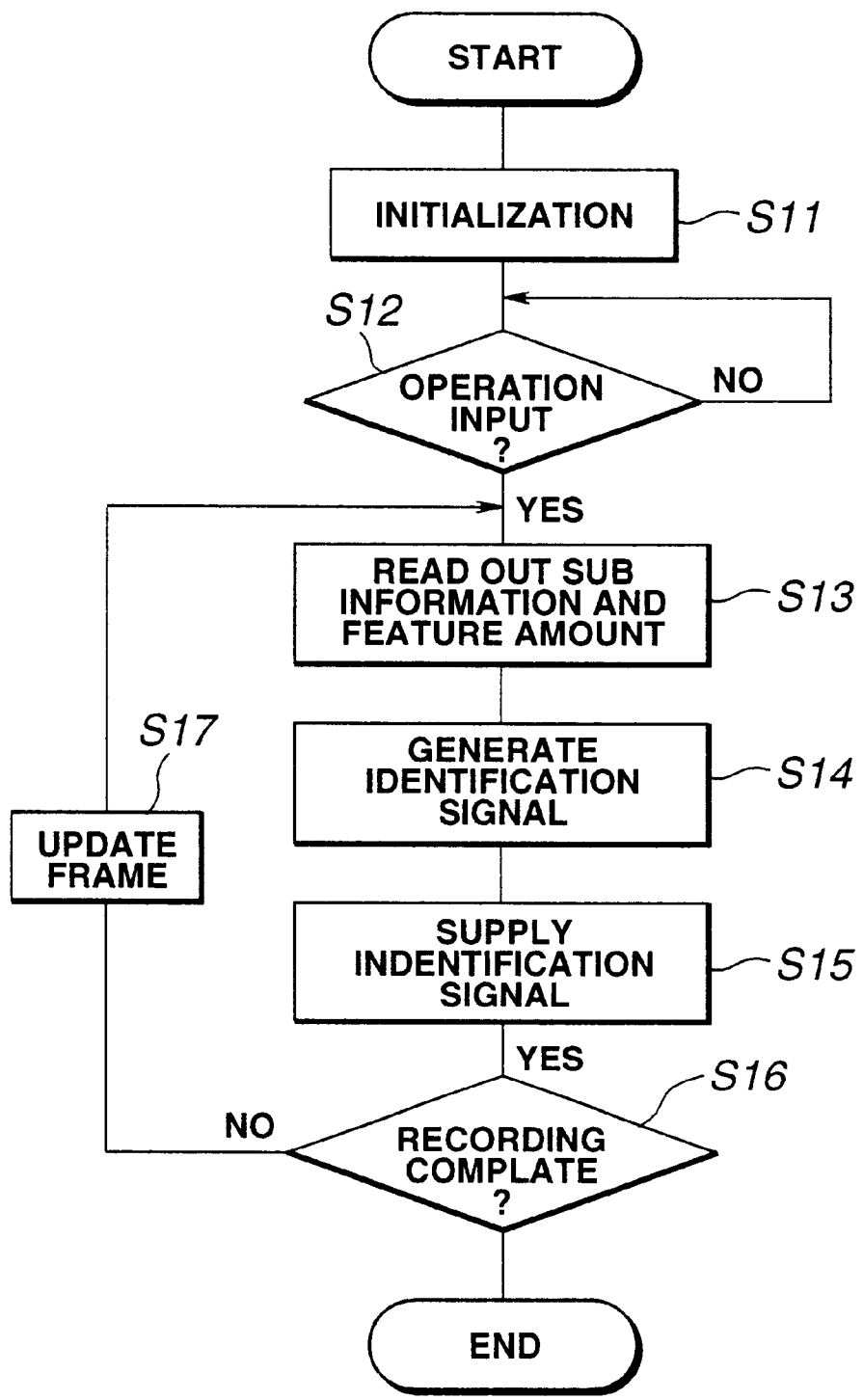
FIG. 2 is a flowchart showing a processing procedure of a system controller of the aforementioned video signal recording apparatus.

On the other hand, the system controller 20, according to the aforementioned sub information and the feature amount, executes the processing shown in a flowchart of FIG. 2 for generating an identification signal.

When an operation of the video signal recording apparatus 1 is started, for example, when a power is turned on, the system controller 20 starts the processing of step S11 and after.

In step S11, the system controller 20 initializes the sub information detecting circuit 16, the feature amount detecting circuit 17, and other circuits under control. Next, in step S12, it is determined whether a recording start input operation has been made by a user, i.e., whether a recording has been specified by a user. If no operation input is made by the user, the system enters a wait state in this step S12 and when an operation input is made by the user, control is passed to step S13.

In step S13, the system controller 20 transmits a control signal of recording start to respective circuits. When a recording operation is started in the respective circuits, the system controller 20 reads out a sub information and a feature amount from the sub information detecting circuit 16 and the feature amount detecting circuit 17.

Next, in step S14, the system controller 20, according to the sub information and the feature amount read out, generates an identification signal as follows.

That is, a telop identification signal indicating that a telop is present in that frame; a music start identification signal indicating that a music starts in that frame; a music end identification signal indicating that a music ends in that frame; a person identification signal indicating that a particular person is present in that frame; a program identification signal indicating that a particular program video data is recorded in that frame; a genre identification signal indicating the genre of the program of that frame; a broadcast time identification signal indicating a broadcast time of that frame; and the like.

It should be noted that these identifications are given above as examples, and their contents are not limited to particular ones if they are identification signals which can be generated according to the sub information and the feature amount.

Next, in step S15, the system controller supplies the generated identification signal to the recording processing circuit 14.

The recording processing circuit 14, when supplied with this identification signal, records a video signal and an audio signal supplied from the video signal compression circuit 7 and the audio signal compression circuit 13 onto the recording medium 15 while adding a corresponding identification signal to respective frames of this video signal. More specifically, this identification signal is recorded in a FAT (File Allocation Table), TOC (Table of Contents), a file management information area called a sub code, an area called Navigation pack in the DVD-VIDEO format. It should be noted that these file management information items may be created as an actual data stream by the system controller 20, which is combined by the video signal by the recording processing circuit 14.

Moreover, the recording processing circuit 14, instead of recording the identification signal in such a file management area, can record the identification signal in a separate area on the recording medium 15 together with a synchronous information of the video signal.

Next, in step S16, the system controller 20 determines whether the recording is complete. Unless the recording is complete, control is passed to step S17.

In step S17, the system controller 20 updates the frame for detecting a sub information and a feature amount and repeats the processing of step S13 and after. It should be noted that here a sub information is created for each frame and the processing is updated for each frame. However, it is also possible to generate a sub information for each constant unit time and update the processing. In such a case, a time management information is required for synchronization with the identification signal.

When it is determined that the proceeding is complete in step S16, the system controller 20 terminates the processing from step S11 to this step S17.

As has been described above, the video signal recording apparatus 1 generates a plurality of identification signals corresponding to respective screens according to the sub information and feature amount of the video signal and records these identification signals for generating a search screen, together with the video signal on a recording medium, so as to enable to grasp the outline of the contents of the video signal recorded as well as to effectively search the video signal, generating a search screen.

Next, description will be directed to a video signal reproduction apparatus according to an embodiment of the present invention with reference to the attached drawings.

This video signal reproduction apparatus according to the embodiment is an apparatus for reproducing a video signal from a recording medium and creating a search screen for searching the video signal according to an identification signal recorded on the recording medium.

Figure 3:
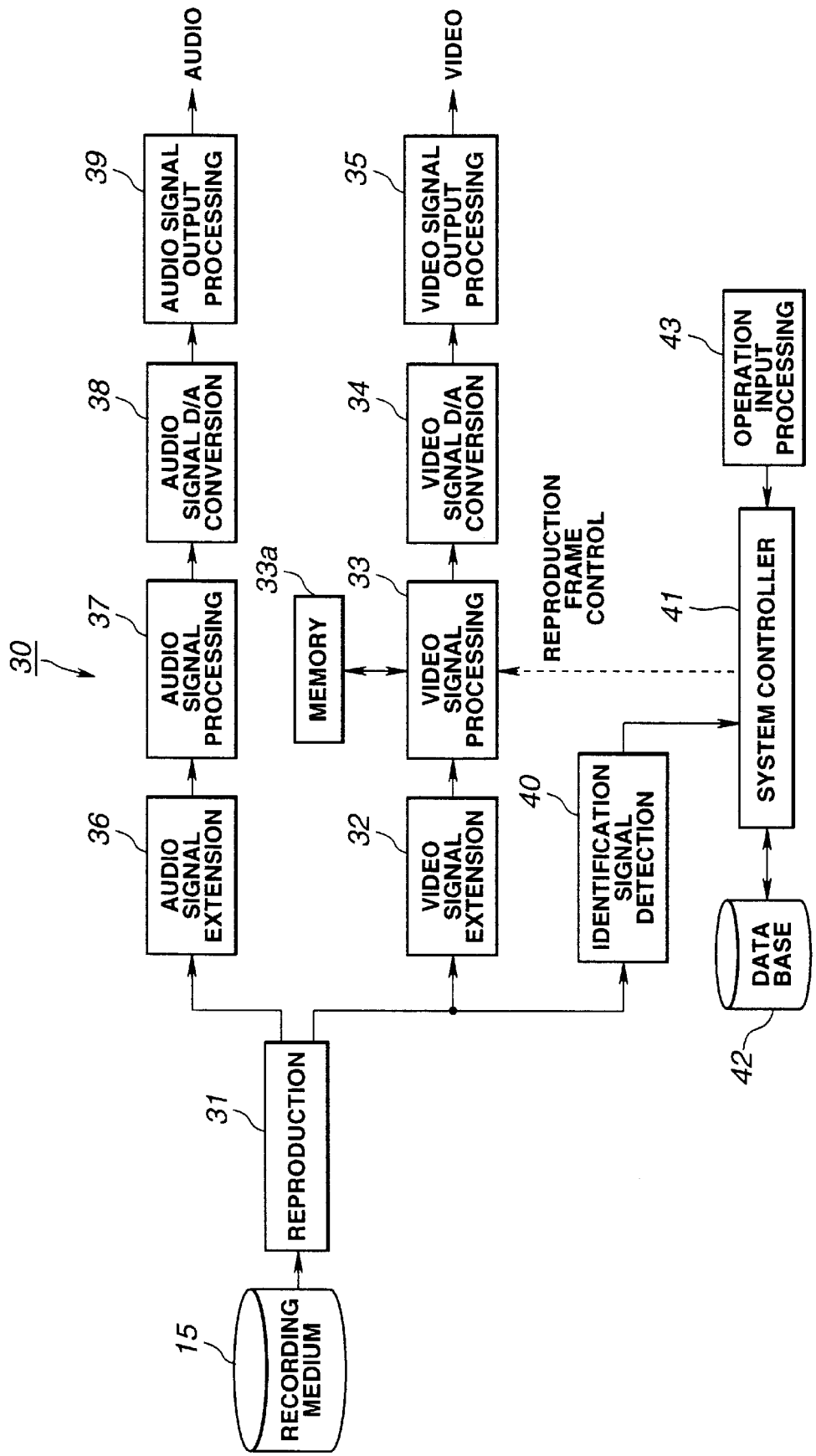
FIG. 3 is a block diagram showing a video signal reproduction apparatus according to an embodiment of the present invention.

FIG. 3 is a block diagram showing a configuration of the video signal reproduction apparatus 30 according to the embodiment of the present invention. The video signal reproduction apparatus 30 includes: a reproduction processing circuit 31 for reproducing a video signal and an audio signal from a recording medium 15; a video signal extending circuit 32 for extending the video signal reproduced by the reproduction processing circuit 31; a video signal processing circuit 33 for executing a predetermined processing to the video signal extended according to control from a system controller 41 which will be detailed later; a memory 33a used as a processing field of this video signal processing circuit 33; a video signal digital-to-analog conversion circuit (hereinafter, referred to simply as a video signal D/A conversion circuit) for converting the digital video signal processed by this video signal processing circuit, into an analog video signal; and a video signal output processing circuit 35 for output processing of the analog video signal.

Moreover, the video signal reproduction apparatus 30 includes: an audio signal extending circuit 36 for extending an audio signal reproduced from the reproduction processing circuit 31; an audio signal processing circuit 37 for executing a predetermined processing to the extended audio signal according to control form the system controller 41 which will be detailed later; an audio signal digital-to-analog conversion circuit (hereinafter, referred to as an audio signal D/A conversion circuit) 38 for converting the digital audio signal processed by this audio signal processing circuit 37, into an analog audio signal; and an audio signal output processing circuit 39 for output processing to the analog audio signal.

Moreover, the video signal reproduction apparatus 30 includes an identification signal detecting circuit 40 for detecting an identification signal from the reproduction signal reproduced from the reproduction processing circuit 31.

Moreover, the video signal reproduction apparatus 30 includes: the system controller 41 which according to the detected identification signal controls the video signal processing circuit 33 as well as other circuits; a data base 42 which stores a data to be referenced by this system controller 41; and an operation input processing circuit for supplying an operation input information to this system controller 41.

The recording medium 15 may be any kind of recording medium such as a hard disc, magnetic disc, magneto-optical disc, memory card, and the like. This recording medium 15 contains a video signal recorded by the aforementioned video signal recording apparatus 1 and its identification signal.

If the recording medium 15 is an optical disc for example, the recording processing circuit 31 reproduces a data from a pickup or the like, demodulates the data by a predetermined method, and correct errors. The recording processing circuit 31 supplies a video signal and an audio signal recorded on the recording medium 15, to the video signal extending circuit 32 and the audio signal extending circuit 36. Moreover, the recording processing circuit 31 reproduces a TOC information which is recorded together with the video signal and the like, and supplies the reproduced TOC information of the identification signal detecting circuit 40.

The video signal extending circuit 32 is supplied with a compressed video signal from the recording processing circuit 31. The video signal extending circuit 32 extends the compressed video signal by way of the MPEG2 method for example, and supplies the obtained signal to the video signal processing circuit 33.

The video signal processing circuit 33 is supplied with the extended video signal from the video signal extending circuit 32. The video signal processing circuit 33, according to control form the system controller 41, executes a processing to the video signal by using the memory 33a, and generates a search screen. This processing will be detailed later. The video signal processing circuit 33 supplies the processed video signal to the video signal D/A conversion circuit 34.

The video signal D/A conversion circuit 34 is supplied with a digital video signal from the video signal processing circuit 33. The video signal D/A conversion circuit 34 converts the digital data into an analog signal for supply to the video signal output processing circuit 35.

The video signal output processing circuit 35 is supplied with the analog video signal from the video signal D/A conversion circuit 34. The video signal output processing circuit 35 amplifies this analog video signal and outputs the signal, for example, to a monitor apparatus as an external apparatus.

The audio signal extending circuit 36 is supplied with a compressed audio signal from the recording processing circuit 31. The audio signal extending circuit 36 extends the compressed audio signal, for example, by the MPEG2 method, and supplies the obtained signal to the audio signal processing circuit 37.

The audio signal processing circuit 37 is supplied with the extended audio signal from the audio signal extending circuit 36. The audio signal processing circuit 37, according to control from the system controller 41, executes a predetermined processing to the audio signal. The audio signal processing circuit 37 supplies the processed audio signal to the audio signal D/A conversion circuit 38.

The audio signal D/C conversion circuit 38 is supplied with the digital audio signal from the audio signal processing circuit 37. The audio signal D/A conversion circuit 38 converts the digital data into an analog signal for supply to the audio signal output processing circuit 39.

The audio signal output processing circuit 39 is supplied with the analog audio signal from the audio signal D/A conversion circuit 34. The audio signal output processing circuit 35 amplifies this analog audio signal and outputs, for example, to a loud speaker as an external apparatus.

The identification signal detecting circuit 40 is supplied with, for example, a TOC information and a sub code information which serve as a management information of the video signal and the like reproduced from the recording processing circuit 31. The identification signal detecting circuit 40 detects from this management information an identification signal recorded by the aforementioned video signal recording apparatus 1. The identification signal detecting circuit 40 supplies this identification signal to the system controller 41, relating the signal to a frame number processed in the video signal processing circuit 33 and a time information of the frame.

Here, the identification signal detected by the identification signal detecting circuit 40 may be, for example, a telop identification signal indicating that a telop is present in the frame, a music start identification signal indicating that a music starts in the frame, a music end identification signal indicating that a music ends in the frame, a person identification signal indicating that a particular person is present in the frame, a program identification signal indicating that a particular image is recorded in the frame, a genre identification signal indicating the genre of the program of the frame, a broadcast time identification signal indicating the broadcast time of the frame, and the like.

The system controller 41 is supplied with the identification signal from the identification signal detecting circuit 40. The system controller 41, according o the inputted identification signal, controls the video signal processing circuit 33 so as to generate a search screen which will be detailed later.

Moreover, the system controller 41, in accordance with control of this video signal processing circuit 33, controls the audio signal processing circuit 37 and controls the audio signal to be reproduced.

Moreover, the system controller 41 is supplied with a control information or the like from the data base 42. The system controller 41, according to this control information, carries out various control operations.

Moreover, the system controller 41 is supplied with an operation input information from the operation input processing circuit 43. The system controller 41, according to this operation input information, carries out various control operations.

Next, explanation will be given on the processing procedure of the system controller 41 and the search screen generated by the video signal processing circuit 33.

Figure 4:
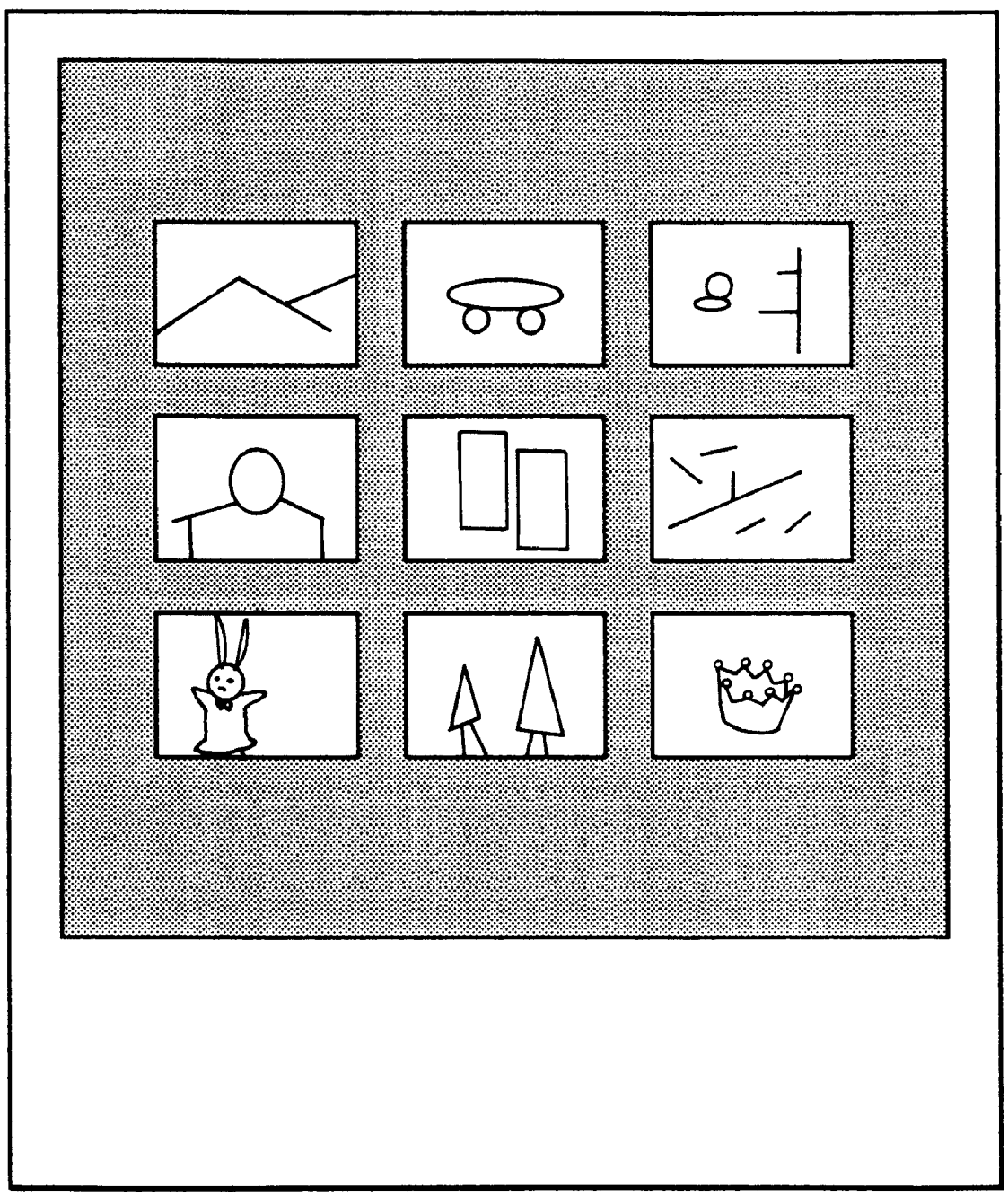
FIG. 4 explains a search screen reproduced by the aforementioned video signal reproduction apparatus.

FIG. 4 explains the search screen generated by the video signal reproduction apparatus 30. Here, the search screen means a plurality of typical screens on a monitor for grasping the contents of the video signal recorded on the recording medium 15.

The video signal processing circuit 33, according to control of the system controller 41, generates this search screen. That is, the system controller 41 decides a frame to be displayed on the search screen, according to the identification signal. The system controller 41 makes the video signal processing circuit 33 read out this frame from the recording medium 15. When the video signal processing circuit 33 is supplied with the frame to be displayed on the search screen according to control from the system controller 41, the video signal processing circuit 33 generates respective frames in memory 33a and outputs a plurality of frames reduced in size in a single frame as shown in FIG. 4.

It should be noted that the system controller 41 selects the frames to be displayed on the search screen, according to a user operation input and an information in the data base 42. That is, the system controller 41, among a plurality of identification numbers recorded on the recording medium 15, decides which identification number should be related to a frame, according to the user operation input and the like.

Hereinafter, explanation will be given on the processing of the system controller 41 for creating this search screen with reference to a flowchart of FIG. 5.

The system controller 41 starts the processing of step S21 where the power is turned on for the video signal reproduction apparatus 30 for starting the operation.

In step S21, the system controller 41 initializes respective circuits under control including the video signal processing circuit 33 and the identification signal detecting circuit 40. Next, in step S22, it is determined whether a user operation input is present. I no user operation input is found, the system enters a wait state in this step S22. When a user operation is detected, control is passed to step S23.

In step S23, the system controller 41 determines whether the user operation input is a search screen creation operation.

If the input specifies the search screen generation, control is passed to step S25. Otherwise, for example, if a video signal reproduction or a high-speed reproduction is specified, control is passed to step S24.

In step S24, the system controller 41 executes control of a reproduction processing and terminates the processing.

Moreover, in step S25, according to the user operation input or the like, the system controller 41 executes an identification signal selection for detecting a frame to be outputted as a search screen. That is, in order to display a frame specified by the user, an identification number corresponding to the frame is selected.

Figure 6:
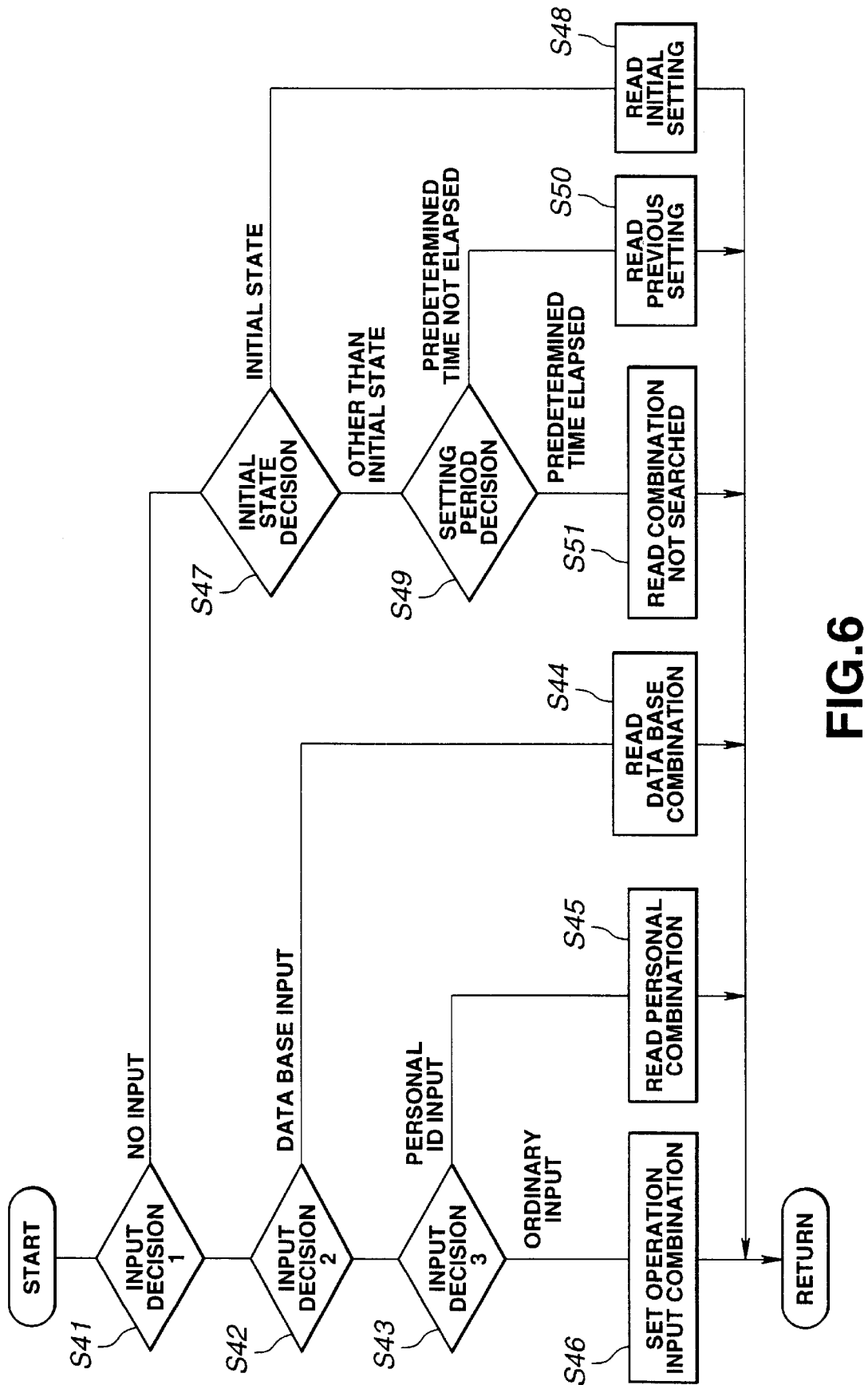
FIG. 6 is a flowchart showing a processing procedure of a system controller of the video signal reproduction apparatus.

More specifically, in this step S25, the system controller 41 executes a processing of steps S41 to S51 shown in a flowchart of FIG. 6.

Firstly, in steps S41 to S43, the system controller 41 determines whether an identification signal setting input has been specified by a user operation input. Here, the identification signal setting input by the user may be, for example, one of the three cases: a data base setting input; a personal ID setting input; and an ordinary setting input.

In the case of the data base setting input, several patterns of combination of identification signals are stored in the data base 42 in advance, so that a search screen is created by the combinations of the identification signals stored. For example, if a setting of a combination of a news program identification signal and a telop identification signal and a setting of a music start identification signal are stored, one of the settings specified by the user is read out from the data base 42.

In the case of personal ID setting input, the user stores combinations of identification signals on the data base 42 and the recording medium 15 in advance. In this case, the user stores in advance a personal combination of identification signals, and when creating a search screen, this setting is read out by inputting a personal ID code. More specifically, if the user in advance stores a combination of an identification signal of sports programs and an identification signal of player A, this setting is read out from the data base 42 or the recording medium 15 when the user ID code is entered.

In the case of the ordinary setting input, among a plurality of identification signals, an arbitrary identification signal is selected by the user, and setting of the AND condition and OR condition of the selected identification signal is entered. The setting is entered at this moment without reading in an information which has been set in advance.

In step S41, if the system controller 41 determines that none of these three operation inputs is present, control is passed to step S47. If the system controller 41 determines that the data base setting input is present, control is passed from step S42 to step S44 where the setting is read out from the data base 42, terminating the processing. If the system controller 41 determines that the personal ID setting input is present, control is passed from step S43 to step S45. In step S45, a personally set information is read out from the data base 42 or the recording medium 15, terminating the processing. If the system controller 41 determines that an ordinary input is present, control is passed from step S43 to S46. In this step S46, an identification signal is set according to the user operation input, terminating the processing.

In step S47, the system controller 41 determines whether the video signal reproduction apparatus 30 is in an initial state. That is, the system controller 41 is in this initial state when the video signal reproduction apparatus 30 is firstly activated or reset. If in the initial state, control is passed to step S48 and in this step S48, an initialization information is read out from the data base 42, terminating the processing.

Moreover, if not in the initial state, in step S49, the setting of identification signal used for a search screen is read out and it is determined whether a predetermined period of time has elapsed after this setting is made. For example, it is determined whether a month has passed after creation of the search screen. If it is determined that a predetermined period of time has not elapsed, control is passed to step S50, and if it is determined that the predetermined period of time has elapsed, control is passed to step S51.

In step S50, the system controller 41 reads out the previous setting from the data base, terminating the processing. Moreover, in step S51, the system controller 41 sets an identification signal which is not set in the previous setting and terminates the processing.

Figure 5:
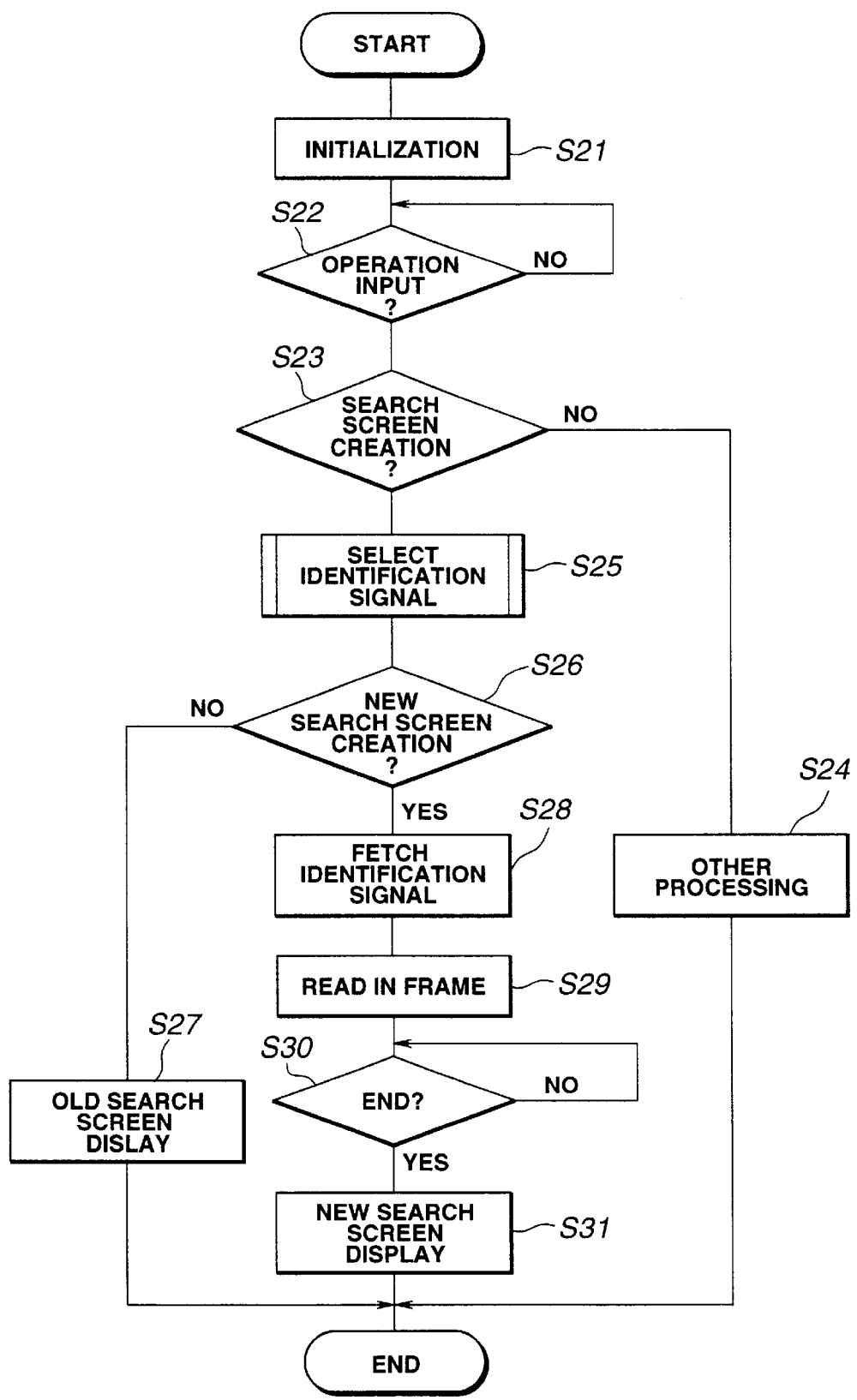
FIG. 5 is a flowchart showing a processing procedure of a system controller of the video signal reproduction apparatus.

The system controller 41 executes the processing of the aforementioned steps S41 to S51 and sets or reads out an identification signal to be detected, passing control to step S26 shown in FIG. 5.

In step S26, the system controller 41 determines whether to create a new search screen. If no new search screen is to be created, control is passed to step S27 and in this step S27 an old search screen stored in the memory 33a is displayed. Moreover, if a new search screen is to be created, control is passed to step S28.

In step S28, the system controller 41 fetches the identification signal set in step S25, from the recording medium 15 via the identification signal detecting circuit 40.

In the subsequent step S29, the system controller 41, according to the fetched identification signal, makes store in the memory 33a the frame to be displayed on the search screen. Here, the video signal processing circuit 33 reduces the frame to be reduced in the memory 33a, so that a plurality of frames can be displayed on a signal frame search screen. Then, in step S30, it is determined whether the search screen creation is complete. If the search screen creation is complete, control is passed to step S31.

In step S31, the new search screen stored in the memory 33a is outputted so as to be displayed on the monitor, and the processing is terminated.

As has been described above, in the video signal reproduction apparatus 30, such a search screen is created according to a plurality of identification signals corresponding to respective screens according to a sub information and a feature amount of a video signal, thus enabling to easily grasp the outline of contents of the video signal as well as to effectively retrieve the video signal.

Figure 7:
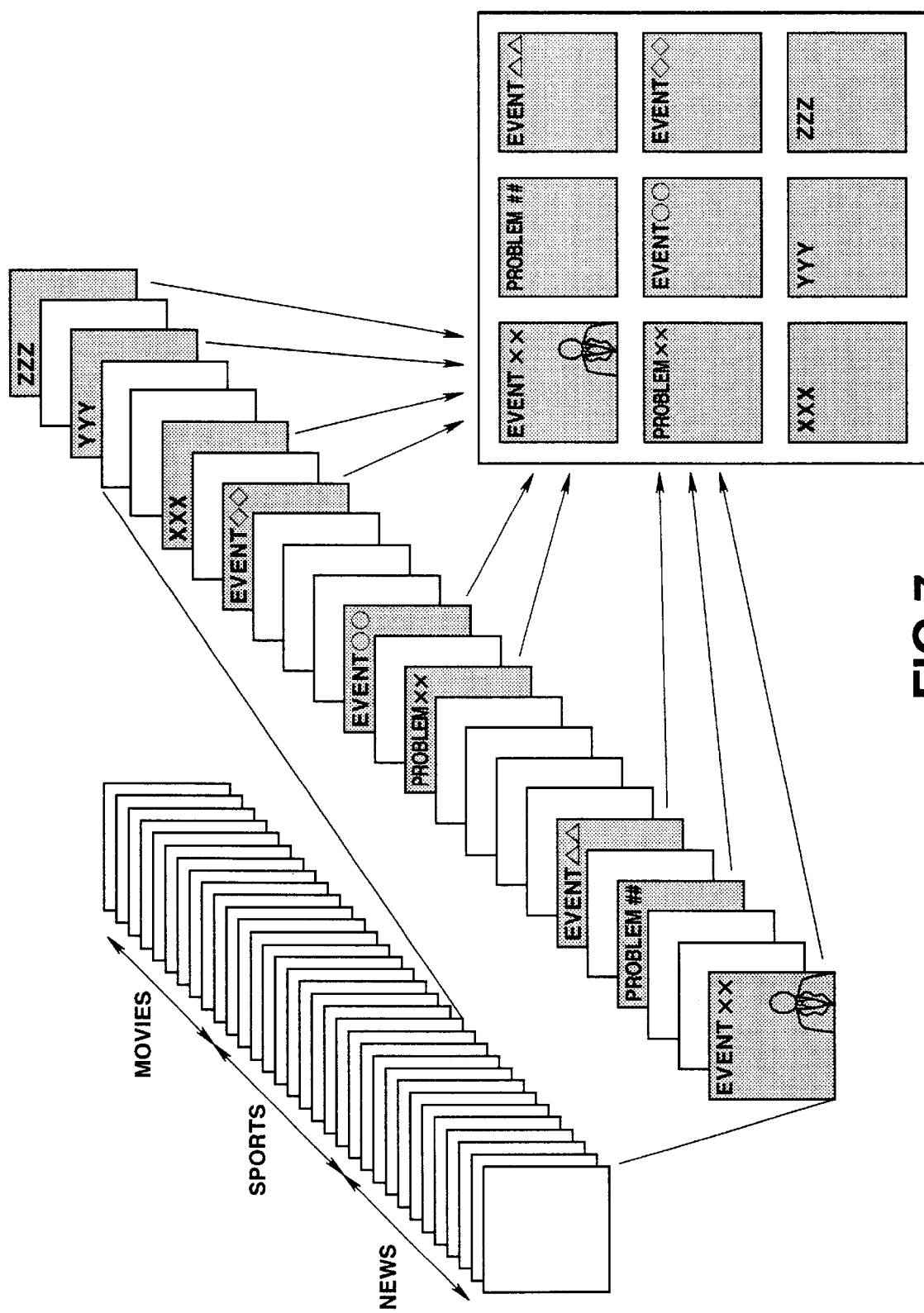
FIG. 7 explains the search screen reproduced by the video signal reproduction apparatus.

In the video signal reproduction apparatus 30, if a search screen is created by the condition of a news identification signal and a telop identification signal, the search screen appears on the monitor as shown in FIG. 7.

Figure 8:
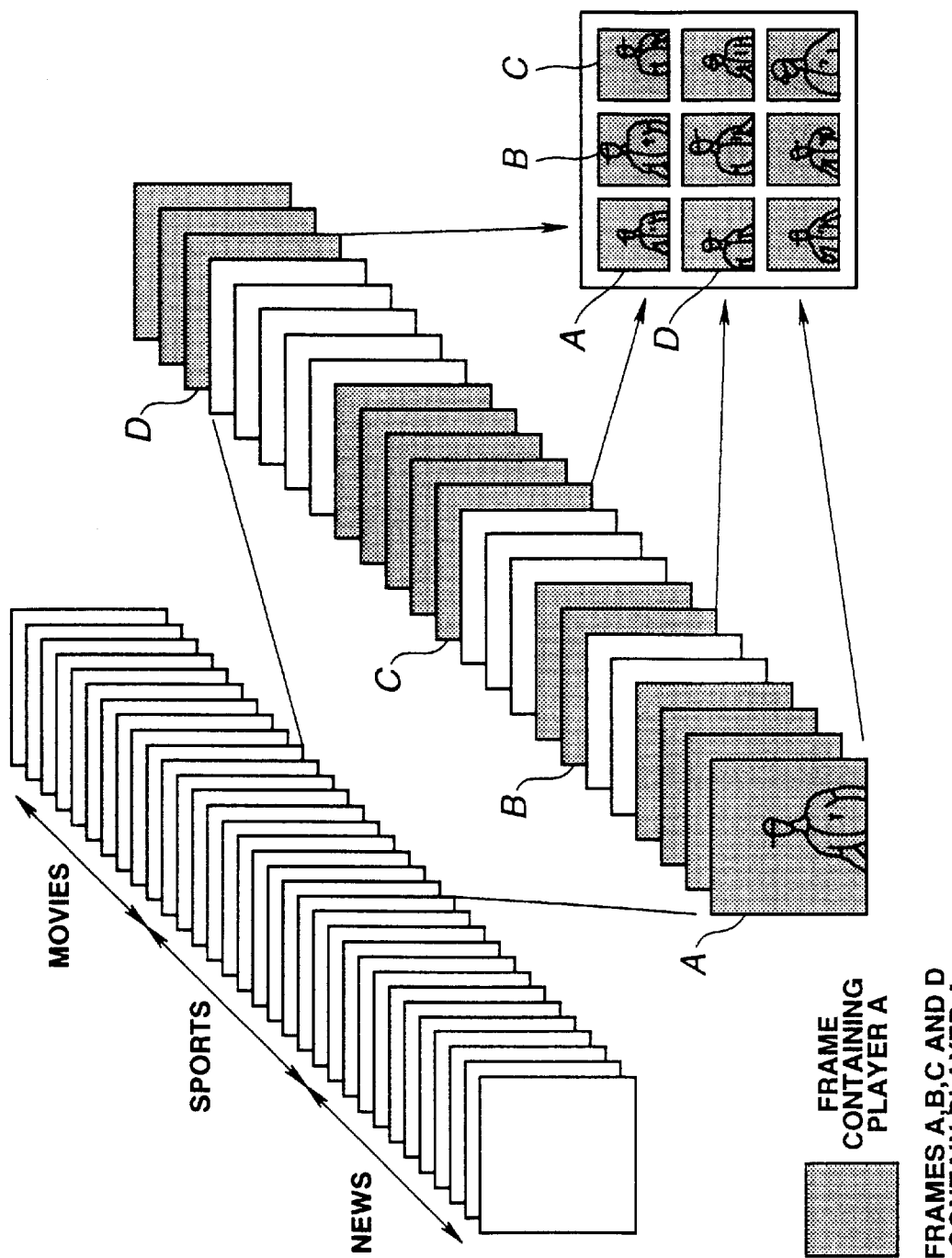
FIG. 8 explains the search screen reproduced by the video signal reproduction apparatus.

It should be noted that in the video signal reproduction apparatus 30, if too many frames correspond to an identification signal specified and they cannot be displayed on a single search screen, for example, only a head frame of continuous frames is displayed. More specifically, FIG. 8 shows a case of a search screen created by the condition of a sports identification signal and a player A identification signal.

Next, description will be directed to an optical disc according to an embodiment of the present invention with reference to the attached drawings. This optical disc is a recording medium containing a video signal and an identification signal recorded by the aforementioned video signal recording apparatus 1.

Figure 9:
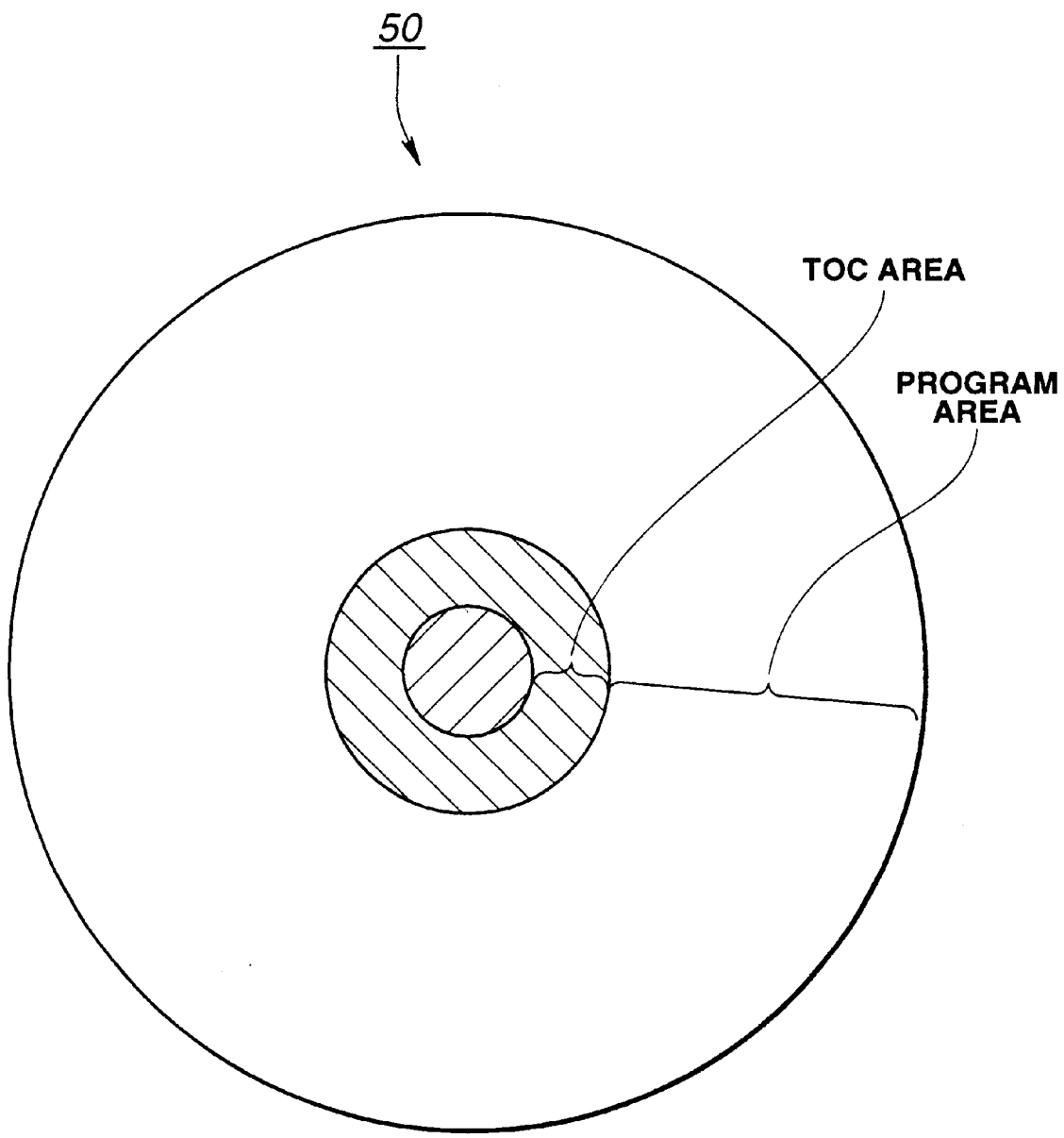
FIG. 9 explains a recording area on an optical disc according to an embodiment of the present invention.

As shown in FIG. 9, an optical disc 50 is divided into a program area and a TOC area. In the program area and the TOC area, a data is written and read out on a sector basis having a recording capacity of 2532 bytes, for example.

Figure 10:
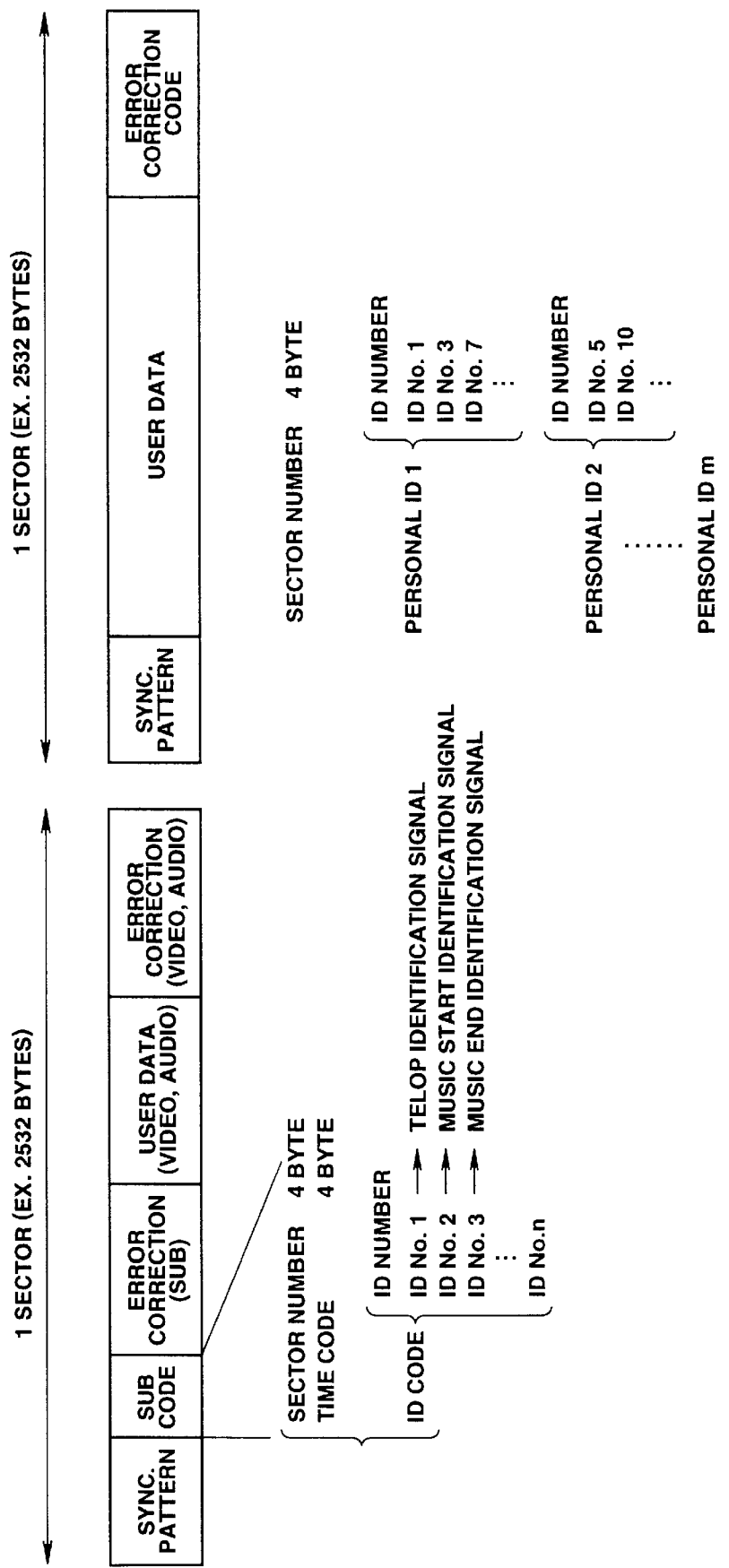
FIGS. 10A–10B explain a data configuration of the aforementioned optical disc.
Figure 11:
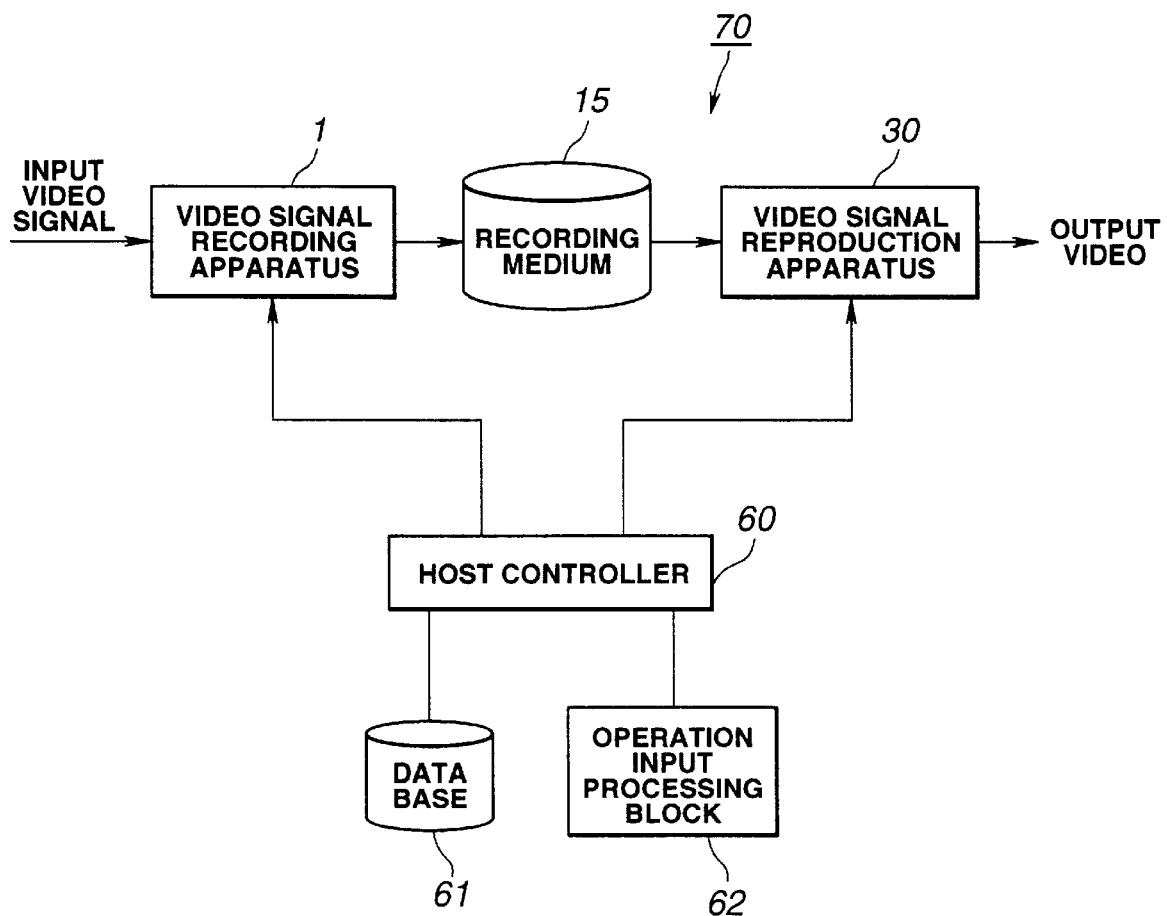
FIG. 11 a block diagram showing video signal recording/reproduction apparatus according to an embodiment of the present invention.

Each sector of the program area has a data configuration as shown in FIG. 10A, consisting of a synchronous pattern where a synchronization data is recorded; a sub code; a sub code error correction code where an error correction data of the sub code is recorded; a user data where a video data and audio data are recorded; a user data error correction code where an error correction data of the user data is recorded, and the like.

the sub code has a data configuration consisting of a Sector Number (for example, four bytes) indicating a sector number; a Time Code (for example, four bytes) indicating an absolute time; an ID Code, and the like.

The ID code contains various identification signal information items: an ID number indicating the number of identification signals recorded, ID No. n identifying a telop identification signal, a music start identification signal, a music end identification signal, and the like.

Each of the ID NO. n contains, for example, an address and a time code. The video signal reproduction apparatus 30 retrieves an address of this ID NO. n and creates a data of that address, thus enabling to display a target frame.

Moreover, FIG. 10B shows a data configuration of each of the sectors of the TOC area, consisting of a synchronous pattern where a synchronization data is recorded; a user data where a management information is recorded; an error correction code where an error correction data of the user data is recorded, and the like.

The user data has a data configuration consisting of a Sector Number (for example, 4 bytes) indicating a sector number; a personal ID data, and the like. The personal ID data, as has been described above, is a data of the identification signal where a combination is set by the user. More specifically, this personal ID contains ID numbers of respective identification signals indicated in the sub code of the program area. Moreover, the user data a number of the personal ID which corresponds to the number of users registered.

For the optical disc 50 having the aforementioned data configuration, the recording apparatus of this optical disc 50 records an identification signal together with a video signal in the sub code of the program area. Moreover, the reproduction apparatus of the optical disc 50 reproduces the sub code of the program area together with a video signal. Furthermore, the reproduction apparatus of the optical disc 50 reproduces the aforementioned personal ID from the user data of the TOC area and reproduces an identification signal corresponding to this personal ID.

As has thus far been described, the optical disc 50 enables to record a plurality of identification signals corresponding to respective screens according to a sub information and a feature amount of a video signal as well as to effectively grasp the outline of contents of the video signal and effectively retrieve the video signal by reproducing this optical disc.

It should be noted that an example of format of an optical disc has been described as an embodiment of the present invention. However, the present invention is not to be limited to this optical disc but can be applied to other formats.

Moreover, explanation has been given on the video signal recording apparatus 1, the video signal reproduction apparatus 30 and the recording medium 50 as embodiments of the present invention, but it is also possible to realize a video signal recording and reproduction apparatus 70 according to the present invention by providing a host controller 60 capable of controlling both of the video signal recording apparatus 1 and the video signal reproduction apparatus 30, a data base 61, and an operation input processing block 62.

What is claimed is:

1. A video signal recording apparatus comprising:

sub information detecting means for detecting a sub information from a video signal; wherein said sub information is a telop appearance, a music start, a music end, a person appearance, a program content, a program genre, or a broadcast time information corresponding to a frame of said video signal;

feature amount detecting means for detecting a feature amount from a video signal; wherein said feature amount is a motion vector, a telop appearance, a music start, or a music end information corresponding to a frame of said video signal and a corresponding audio signal;

identification signal generating means for generating identification signals corresponding to respective frames of the video signal, according to said sub information and said feature amount; and recording means for recording said identification signals together with said video signal in sectors of a program area on a recording medium; said identification signals being recorded in a sub code area in each sector of said program area containing the corresponding respective frames of said video signal.

2. A video signal recording method comprising:

a step of detecting a sub information from a video signal; wherein said sub information is a telop appearance, a music start, a music end, a person appearance, a program content, a program genre, or a broadcast time information corresponding to a frame of said video signal;

a step of detecting a feature amount from a video signal; wherein said feature amount is a motion vector, a telop appearance, a music start, or a music end information corresponding to a frame of said video signal and a corresponding audio signal;

a step of generating identification signals corresponding to respective frames of the video signal, according to said sub information and said feature amount; and a step of recording said identification signals together with said video signal in sectors of a program area on a recording medium; said identification signals being recorded in a sub code area in each sector of said program area containing the corresponding respective frames of said video signal.

3. A video signal reproduction apparatus comprising:

identification signal detecting means for, detecting identification signals from sub code areas in each sector of a program area on a recording medium; said identification signals corresponding to a sub information and a feature amount of a video signal; wherein said sub information is a telop appearance, a music start, a music end, a person appearance, a program content, a program genre, or a broadcast time information corresponding to a frame of said video signal; and wherein said feature amount is a motion vector, a telop appearance, a music start, or a music end information corresponding to a frame of said video signal and a corresponding audio signal; and reproduction means for generating a screen comprised of respective frames of said video signal recorded in the sector of said program area on said recording medium corresponding to the detected identification signals.

4. A video signal reproduction apparatus as claimed in claim 3, further comprising selection means for selecting a type of identification signal such that the screen generated by said reproduction means is comprised of respective frames of said video signal corresponding to the selected type of identification signal.

5. A video signal reproduction method comprising:

a step of detecting identification signals-from sub code areas in each sector of a program area on a recording medium; said identification signals corresponding to a sub information and a feature amount of a video signal; wherein said sub information is a telop appearance, a music start, a music end, a person appearance, a program content, a program genre, or a broadcast time information corresponding to a frame of said video signal; and wherein said feature amount is a motion vector, a telop appearance, a music start, or a music end information corresponding to a frame of said video signal and a corresponding audio signal; and a step of generating a screen comprised of respective frames of said video signal recorded in the sector of said program area on said recording medium corresponding to the detected identification signals.

6. A video signal reproduction method as claimed in claim 5, further comprising the step of selecting a type of identification signal such that the screen generated by said reproduction means is comprised of respective frames of said video signal corresponding to the selected type of identification signal.

7. A video signal recording and reproduction apparatus comprising:

a video signal recording block including:
   sub information detecting means for detecting a sub information from a video signal; wherein said sub information is a telop appearance, a music start, a music end, a person appearance, a program content, a program genre, or a broadcast time information corresponding to a frame of said video signal;
   feature amount detecting means for detecting a feature amount from a video signal; wherein said feature amount is a motion vector, a telop appearance, a music start, or a music end information corresponding to a frame of said video signal and a corresponding audio signal;
   identification signal generating means for generating identification signals corresponding to respective frames of the video signal, according to said sub information and said feature amount; and
   recording means for recording said identification signals together with said video signal in sectors of a program area on a recording medium; said identification signals being recorded in a sub code area in each sector of said program area containing the corresponding respective frames of said video signal; and a video signal reproduction block including:
   identification signal detecting means for detecting said identification signals from said sub code areas in each sector on said recording medium; and
   reproduction means for generating a screen comprised of respective frames of said video signal recorded in the sector of said program area on said recording medium corresponding to the,detected identification signals.

8. A video signal recording and reproduction apparatus as claimed in claim 7, wherein said video signal reproduction block, further includes selection means for selecting a type of identification signal such that the screen generated by said reproduction means is comprised of respective frames of said video signal corresponding to the selected type of identification signal.

9. A video signal recording and reproducing method comprising:

a step of detecting a sub information from a video signal; wherein said sub information is a telop appearance, a music start, :a music end, a person appearance, a program content, a program genre, or a broadcast time information corresponding to a frame of said video signal;

a step of detecting a feature amount from a video signal; wherein said feature amount is a motion vector, a telop appearance, a music start, or a music end information corresponding to a frame of said video signal and a corresponding audio signal;

a step of generating identification signals corresponding to respective frames of the video signal, according to said sub information and said feature amount;

a step of recording said identification signals together with said video- signal in sectors of a program area on a recording medium; said identification signals being recorded in a sub code area in each sector of said program area containing the corresponding respective frames of said video signal;

a step of detecting from said sub code areas in each sector on said recording medium said identification signals; and a step of generating a screen comprised of respective frames of said video signal recorded in the sector of said program area on said recording medium corresponding to the detected identification signals.

* * * * *